United States Patent Office 3,467,787
Patented Sept. 16, 1969

3,467,787

CIRCUIT ARRANGEMENT TO SUPERVISE TELECOMMUNICATION AND PARTICULARLY TELEPHONE LINES

Otto Baade, Stuttgart-Weilimdorf, Germany, assignor to International Standard Electric Corporation, New York, N.Y., a corporation of Delaware Filed June 1, 1966, Ser. No. 554,456
Claims priority, application Germany, June 19, 1965, St 24,002
Int. Cl. H04b 3/02
U.S. Cl. 179—79 2 Claims

ABSTRACT OF THE DISCLOSURE

Loop supervision is provided for telephone circuits to enable recognition of short loop interruptions used in key dialling or operating signals or as part of a dial signal. The evaluating portion of the circuit is inserted in a bridge circuit which is made symmetrical by use of a capacitor.

The invention relates to a circuit arrangement to supervise telecommunication equipment and particularly a telephone line.

In voice-frequency key dialling as well as in direct current key dialling, interruptions of the subscriber loop may be used as operational signals or as dial signals. The interruptions may be very short, from two milliseconds upward.

Such short loop interruptions cannot be recognized safely with most known conventional supervising circuits. Circuit arrangements are known which supervise a line loop using symmetrical reading and supervising circuits which measure the current in a wire for evaluating the signals and for indicating the loop condition. Such symmetrical circuit arrangements are however, expensive or inexact.

Known asymmetrical circuits show, moreover, beside the disadvantage of not being able to indicate short interruptions of signals safely, the other disadvantage that through induced voltages which may occur in the vicinity of heavy current lines, the measuring can be inexact or falsified. Moreover, simulated loop interruptions may cause an erroneous fault indication in the circuit arrngements hitherto known. Such simulated loop interruptions occur, for example, when a carbon-type microphone receives a shock, its resistance being suddenly changed as much as one kilohm, even though this does not represent an actual interruption with an infinite resistance.

It is a primary object of the invention to provide a circuit arrangement which meets the requirements of recognizing short loop interruptions, while remaining relatively insensitive to changes in circuits brought about by simulated loop interruptions.

This is achieved, according to the invention, by a novel circuit arrangement to supervise a telecommunication and, particularly a telephone line. In a preferred embodiment a signal is fed via two feed resistors and, inserted in each feeder wire by means of a bridge-type circuit connected to the operating voltage source via the first feeder resistor. One branch of the bridge consists of two voltage divider resistors, the second branch being formed through the series connecton of the second resistor and the line impedance, an evaluating circuit being arranged in the neutral or diagonal branch respectively. A capacitor is connected in parallel to the partial resistor, being directly connected with the line impedance.

To apply the invention it is suitable to select the capacity of the capacitor so that the AC resistance ($1/\omega C_a$) is small compared with the second resistor of the voltage divider.

The invention is now in detail explained with the aid of the accompanying drawings.

Figure 1:
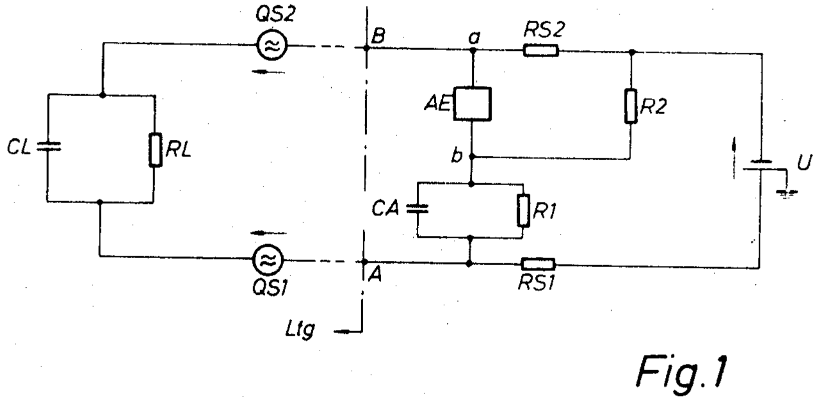

As may be gathered from FIG. 1, a line loop is fed from a current source U via two feeder resistors RS1 and RS2, arranged in the feeder lines terminating at the terminals A and B. The line loop is simulated by a parallel equivalent circuit having elements RL and CL. The line is assumed to pick up interference signals by induction as represented in the drawing by QS1 and QS2. The arrows indicate that the induced longitudinal voltages are of the same phase. The resistors R1 and R2 form a voltage divider, being connected with the negative pole directly via resistor R2, and via R1 to the terminal of the feeder resistor RS1, opposing the supply source, i.e. via RS1 with the positive (grounded) pole of the supply source. The evaluating facility AE is connected to the voltage divider between R1 and R2 and to point B of the line. The capacitor CA is connected in parallel to the resistor R1. The capacitor's AC resistance $1/\omega C_a$ is made very small compared with R2, effects with reference to the interfering voltage sources QS1 and QS2, being AC voltage sources, that they are located symmetrically to the evaluating facility AE and can therefore no longer influence said facility.

Figure 2:
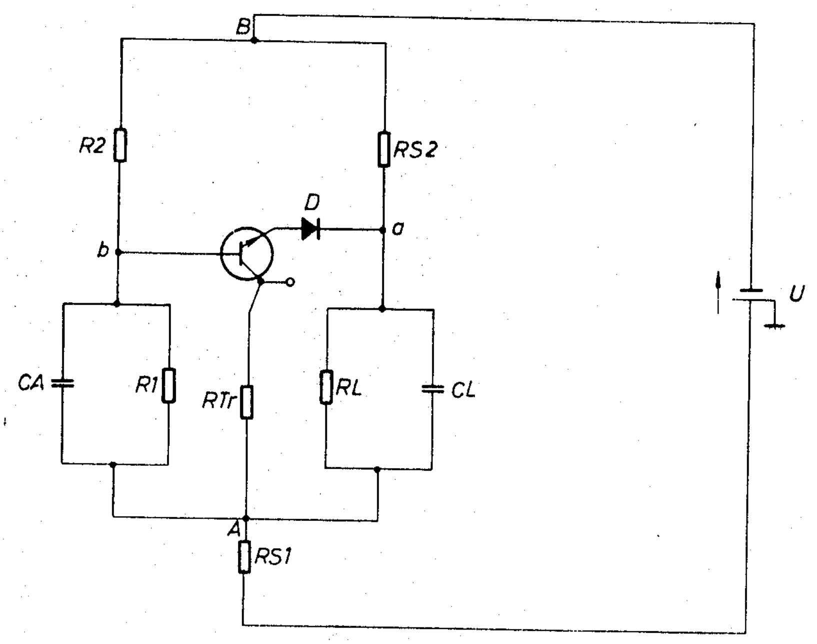

The advantage of the invention is that short loop interruptions are recognized as is explained with the aid of FIG. 2. It is assumed that RS1 is equal to RS2; RS1 is approximately equal to RL and is smaller than R1 and RL2; and R2 is smaller than R1. Assume that during operation with the loop closed, the point $a$ has a potential $\varphi a$ in stationary condition which is larger than the potential $\varphi b$ at point $b$. The transistor T is nonconductive in this example and becomes conductive only when the potential $\varphi b$ is larger (more positive) than $\varphi a$. The time constant TL for the transient phenomenon of the system is such that it ensures that the period until the reversion of the potential condition is longer than the period of possible loop interruptions so that these loop interruptions cannot cause the evaluating facility to respond. The capacitor CL is charged during a loop interruption by the voltage which corresponds to the voltage drop at RL, approximately to the voltage of the feeder source and/or the point $a$ receives the potential of the negative pole of the feeder source. Through the effect of capacitor CA, it is achieved that the potential at point B opposes the potential of the positive pole of the feeder source, depending on the charging process in CL and on the time constant TL, until it reaches the value in compliance with its original charge to reach thereupon the value which corresponds to the voltage drop at $R_1$ in case of an interrupt loop, with the time constant TA, being in relation with the charging process of CA. The first process is thereby decisive, i.e. the opposite course of the potentials $\varphi a$ and $\varphi b$, whereby a quick change of the direction of the voltage between points $a$ and $b$ is achieved. Through the microphone noise equivalent to an increase of the resistance in the loop, a corresponding process is released, too, but the voltage at the evaluating facility is not changed in direction and, consequently, the facility does not respond.

The diode D protects the transistor against too high a base-emitter voltage.

Figure 3:
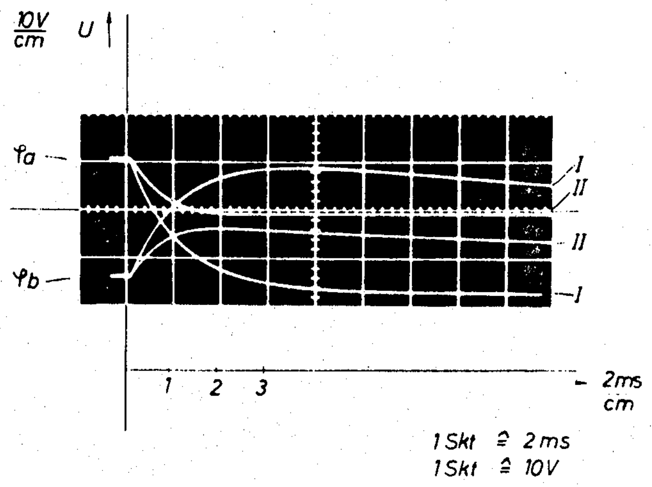

FIG. 3 shows the course of potentials $\varphi a$ and $\varphi b$ at the terminals of the evaluating means for an actual lop interruption (marked with I) and for a simulated loop interruption (marked with II) in an oscillogram. Only in the first case the voltage changes its direction.

In the example shown it can be gathered with the aid of the indicated scale, that in case of an actual loop interruption the response period is below two milliseconds.

When using complex feeder resistors, the response periods do not change essentially.

While the principles of the invention have been described above in connection with specific apparatus and applications, it is to be understood that this description is made only by way of example and not as a limitation on the scope of the invention.

What is claimed is:

1. A circuit arrangement for supervising a telecommunication system comprising a two wire system, a source of operating voltage having two terminals to supply potential to a line impedance over said two wire system, a bridge circuit connected to a first terminal of said source of operating voltage via a first feeder resistor, a first branch of said bridge including a first resistor connected in parallel with a capacitor between said first feeder resistor and a first bridge terminal, and a second resistor connected between said first bridge terminal and a second terminal of said source of operating voltage, a second branch of said bridge including the line impedance connected between said first feeder resistor and a second bridge terminal, and a second feeder resistor connected between said second bridge terminal and said second terminal of said source of operating voltage, the neutral branch of said bridge including an evaluating facility connected between said first and second bridge terminals, said evaluating facility functioning in response to short loop interruptions to switch said capacitor in parallel to said line impedance.

2. A circuit arrangement as claimed in claim 1, in which the capacitive reactance of the capacitor is made small in comparison with the resistance of the second resistor.

References Cited

UNITED STATES PATENTS

| | | | |
|---|---|---|---|
| 3,218,543 | 11/1965 | Nobis | 307—93 X |
| 3,299,404 | 1/1967 | Yamarane et al. | 307—234 X |

KATHLEEN H. CLAFFY, Primary Examiner

J. S. BLACK, Assistant Examiner